United States Patent Office 3,201,320
Patented Aug. 17, 1965

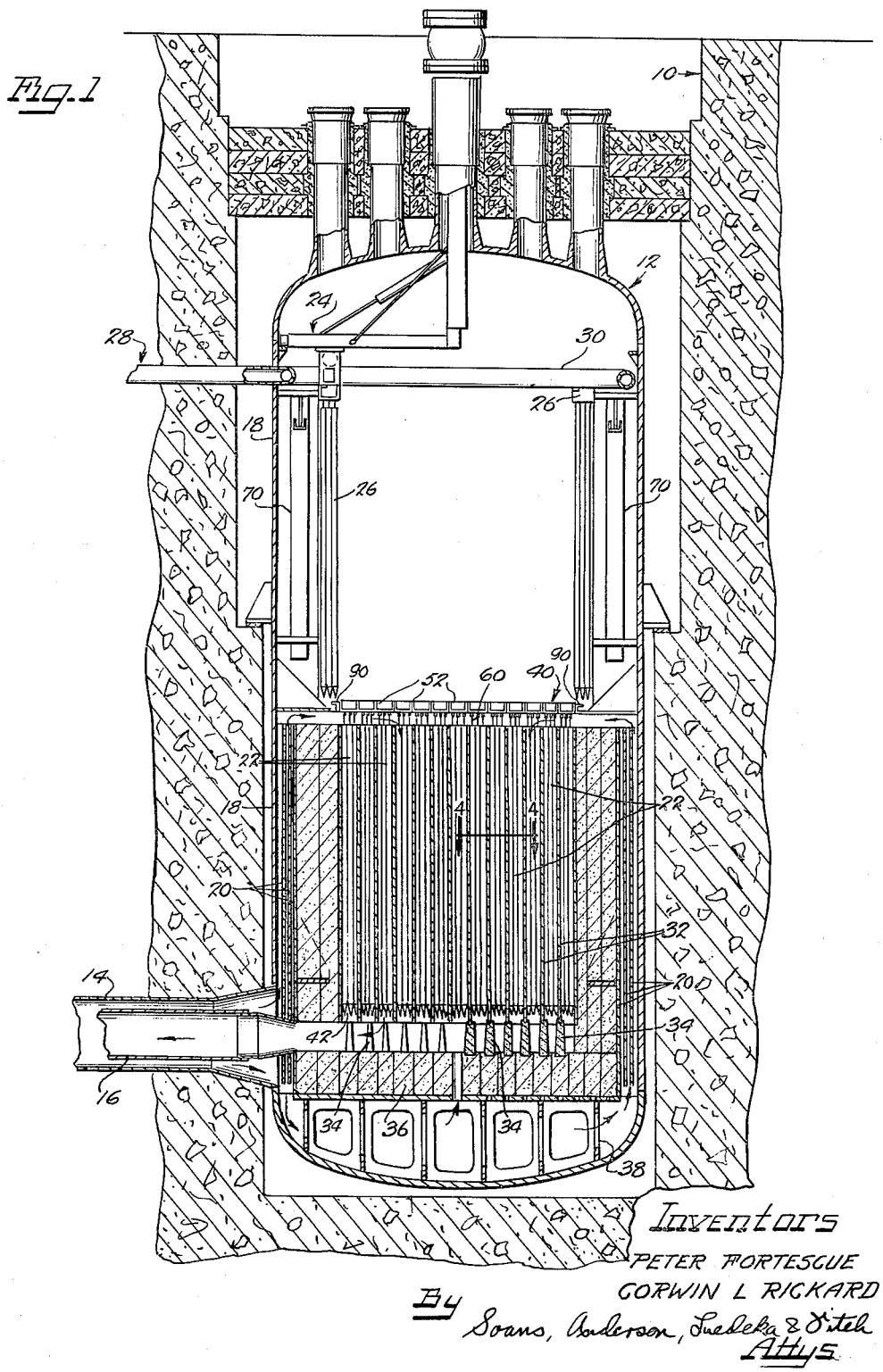

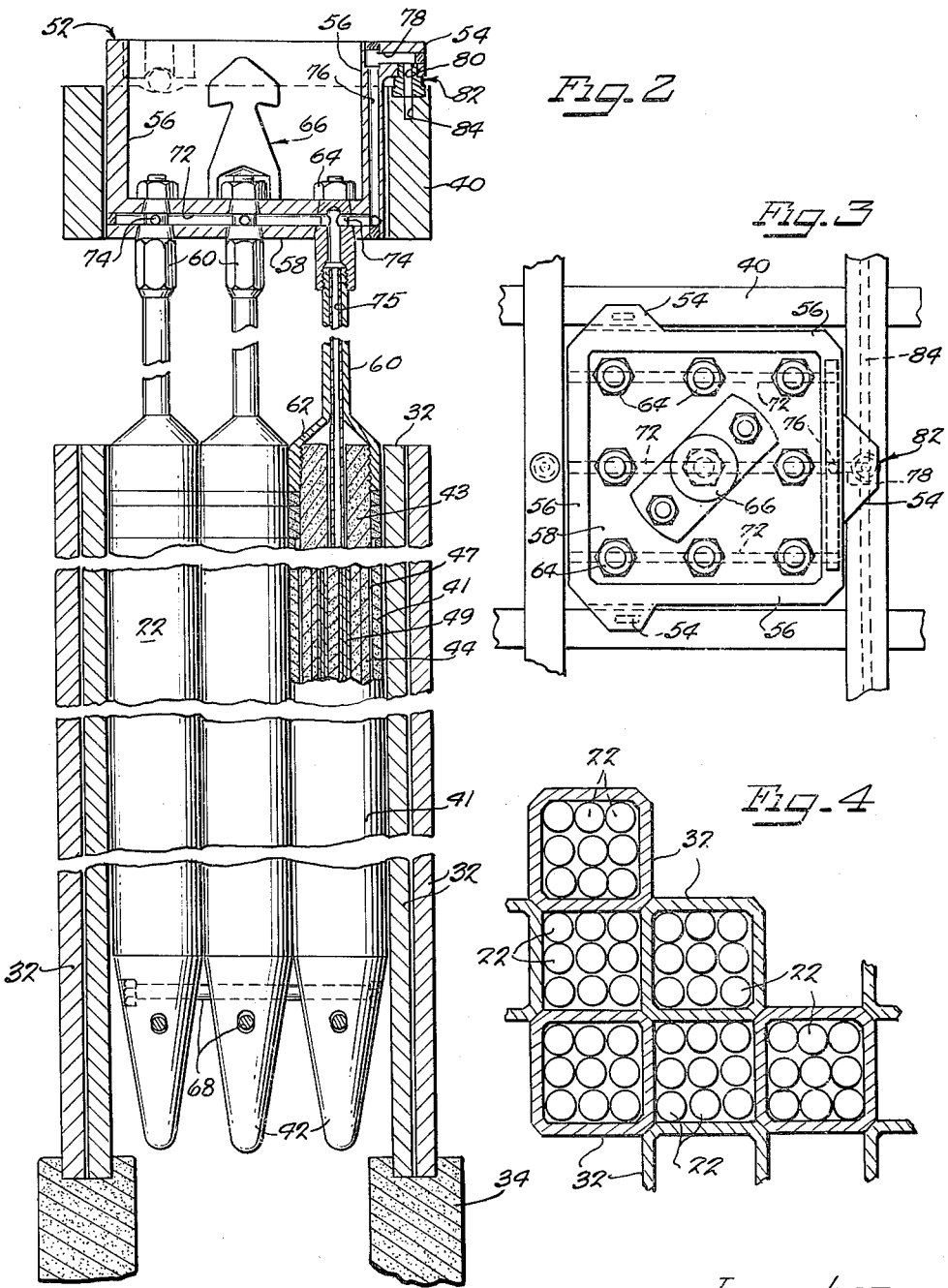

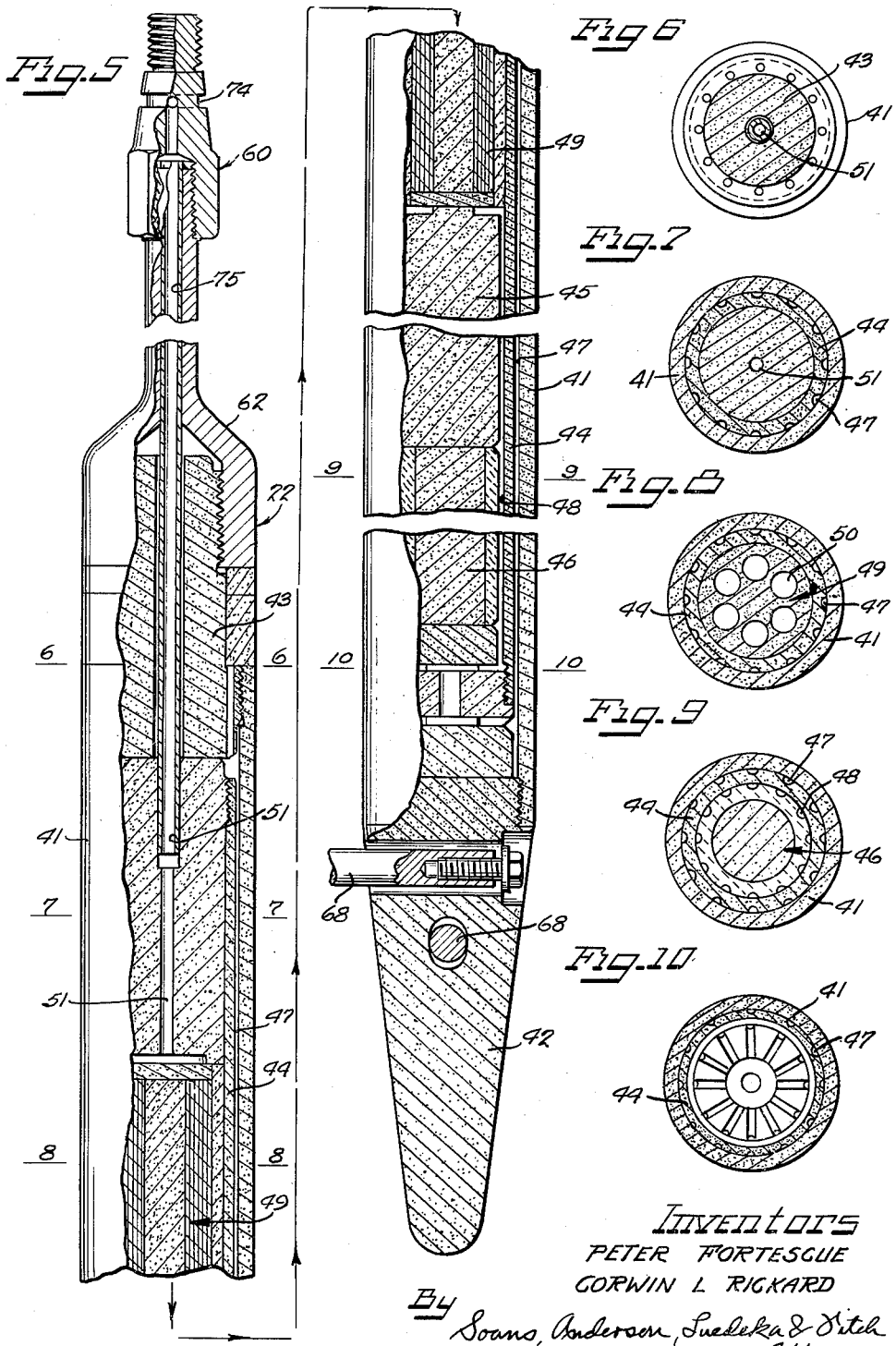

3,201,320
GAS COOLED NUCLEAR REACTOR WITH IMPROVED FUEL ELEMENT ARRANGEMENT
Peter Fortescue, Rancho Santa Fe, and Corwin L. Rickard, Solana Beach, Calif., assignors to General Dynamics Corporation, New York, N.Y., a corporation of Delaware
Filed Dec. 7, 1960, Ser. No. 74,290
5 Claims. (Cl. 176—59)

The present invention relates generally to nuclear reactors and is particularly directed to a novel and improved form of fuel element arrangement for nuclear reactors.

In the design and construction of nuclear reactors, particularly large capacity power reactors intended for commercial usage, it has been found that in order to mantain power economy it is desirable, if not essential, to increase the number of fuel elements in the reactor as the size and capacity of the reactor is increased. Simply to make a corresponding increase in the size of each fuel element would entail an undesirable sacrifice of power density, or would demand an otherwise unnecessarily large core volume. The construction of a desirable and most economical form of high power capacity reactor, for example one capable of producting 150 Mw. (megawatts), consequently involves a large number of fuel elements.

Furthermore, in a high temperature gas-cooled reactor of the larger size indicated above, it has been found possible and expedient to eliminate the metal cladding for the fuel elements and rely entirely upon relatively impervious graphite for encasing the fuel compact. By thus mixing the fuel and the moderator and eliminating the metal cases ordinarily used for the fuel elements, there is achieved an improvement in neutronic economy while permitting high temperature operation such as is required in high temperature gas-cooled reactors. However, there is an accompanying problem to this change with respect to the handling of fission product diffusion.

It is the primary object of the present invention to provide a fuel element arrangement which is particularly advantageous in a reactor having a large number of fuel elements. Another object of the invention is to provide means for supporting fuel elements within the core of a nuclear reactor, which provides passage for the purge flow of fission products. Still another object is to provide a novel fuel element arrangement, wherein a plurality of fuel elements are disposed in a cluster and supported in a manner preventing displacement of the elements during operation of the reactor and affording removal of the cluster as a unit for refueling purposes. Other objects and advantages will become apparent from the following description of a selected embodiment of the invention as seen in the accompanying drawings, wherein:

FIGURE 1 is a cross-sectional view of a nuclear reactor vessel;

FIGURE 2 is an enlarged fragmentary view of structure seen in FIGURE 1, with parts broken away and in section, illustrating one of the fuel element cluster arrangements;

FIGURE 3 is a plan view of the structure seen in FIGURE 2;

FIGURE 4 is an enlarged fragmentary, sectional view taken along the line 4—4 in FIGURE 1;

FIGURE 5 is an enlarged elevational view of one of the fuel elements seen in FIGURE 2, partially broken away and in section; and FIGURES 6 through 10 are sectional views taken along the correspondingly numbered lines in FIGURE 5.

With reference particularly to FIGURE 1 of the drawings, it will be seen that the invention is described with respect to a high temperature gas-cooled nuclear reactor, and more particularly a reactor of large capacity having a power capacity in the neighborhood of 150 megawatts. However, it will be recognized that certain of the features of the invention described herein may be used to advantage in connection with other types of nuclear reactors.

Generally, the reactors is disposed within a well 10 of concrete or other suitable material and includes an outer pressure vessel 12 containing the reactor core. The pressure vessel 12 is in fluid communication with a steam generator or the like (not shown) through means of a pair of concentric ducts 14 and 16 located near the bottom of the vessel. The gas-coolant, such as helium, is introduced into the bottom portion of the vessel through the outer duct 14 and is directed upwardly along the side walls 18 of the vessel by a plurality of thermal shield walls 20 and then downwardly through the reactor core containing the fuel elements 22. The upper portion of the vessel 12 includes fuel handling mechanism, indicated generally at 24, which is adapted to insert and withdraw fuel elements from the core, and storage racks 26 along the walls for temporary storage of spent fuel elements. The upper portion of the vessel is preferably additionally cooled through means of a conduit 28 having connection with the source of coolant (not shown) and which includes a section 30 extending around the inner wall of the vessel.

The core of the reactor is provided with suitable shielding material around the sides and bottom, and it also includes vertically extending separator plates 32 of graphite or the like, which are disposed to form individual cells within the core. These separator plates 32 provide a honeycomb arrangement within the core, with each cell being adapted to receive a plurality of fuel elements. The separator plates are supported at their lower edges by columns 34 of graphite or the like, which rest on a substantially continuous graphite base 36, which also forms a lower neutron reflector and heat shield. This is in turn supported by a structural steel base 38 adjacent the bottom of the pressure vessel. The upper ends of the separator plates 32 are preferably held in position by suitable connection, through dowels or the like, with the top grid plate 40 which provides the shield between the top part of the vessel and the core.

Looking particularly to FIGURES 2-4, it will be seen that the above mentioned separator plates 32 form generally rectangular boxes or cells which are adapted to receive a group or cluster of nine fuel elements 22 in closely but fairly loose fitting relation affording expansion or growth of the fuel elements.

With reference particularly to FIGURES 5 through 10, it is seen that each of the fuel elements 22 comprises an elongated outer sleeve or casing 41 of impervious graphite extending substantially the entire length of the element and threadedly engaged at its lower end with a tapered graphite section 42 comprising a portion of the bottom reflector for the core. The upper end of the outer casing 41 is threadedly engaged with a porous graphite cylinder and sleeve assembly 43, which in turn is suitably connected at its upper end with the fuel element hanger 60. Located within the outer sleeve 41 and extending substantially the entire length of the fuel element is an inner can or container 44, also of graphite, for enclosing the moderator material 45 and the fuel compacts indicated at 46. The moderator material in the form of pervious graphite is preferably provided in sections which extend the length of the fuel element both above and below the fuel compacts 46.

An intermediate section of the fuel element assembly is designed to provide an initial fission products trap, and means is provided internally of the fuel element 22 to afford passage for the purge flow of fission products upwardly into the initial trap and thence to fission products traps, which in the illustrated embodiment are the tanks 70 provided in the upper part of the reactor vessel but which may be externally of the vessel. More particularly, as seen in FIGURE 7 of the drawings, the inner can 44 is formed with longitudinally extending grooves 47 extending the entire length of the can along its outer surface. The porous sleeve portion 43 at the upper end of the fuel element permits the passage therethrough of a small portion of the main coolant flow, which enters the vessel 12 (FIGURE 1) through the conduit 14 and is directed along the sides of the vessel to the upper part of the reactor core and then downwardly through the core as previously described. As the coolant enters the fuel element through the porous sleeve 43, it passes downwardly between the inner can 44 and the outer sleeve 41 along the grooves 47, to a position below the fuel compact 46 (FIGURE 5), and then moves inwardly of the fuel element body and upwardly through another series of longitudinally extending grooves or recesses 48 provided between the fuel compact 46 and the inner wall of the inner can 44. This purge flow of the coolant is directed upwardly beyond the fuel compact to the bottom of an initial fission product trap, indicated at 49, where it flows toward the center of the fuel element body and then upwardly through the circumferentially arranged trap openings 50. At the upper end of trap 49 the purge flow is directed toward the center of the fuel element body into an axial passageway 51, seen particularly in FIGURES 5 and 6, which communicates with an axial passageway 75 in the fuel element hanger.

Nine of the elements 22 are disposed within each box formed by the separator plates 32 to provide a fuel element cluster, which is supported as a unit at its upper end by a metal box 52 having edge supporting flanges 54 which rest on the upper surface of the top grid plate 40 for the reactor core. The fuel element cluster supporting box 52 is generally square and includes four side walls 56 and a bottom 58. The bottom 58 is provided with openings therethrough to receive the hanger member 60 which are connected at their lower ends with the upper end of the fuel elements 22. These hangers 60 comprise generally a slender cylindrical structure having a flared lower end portion 62 threaded internally for engagement with external threads on the upper end of the fuel element portion 43, as indicated above. The upper end of each hanger 60 is tapered inwardly to conform with the downwardly diverging walls of the opening in the bottom wall 58 (FIGURE 2) of the supporting box. A threaded end portion of the hanger projects above the bottom 58 and is suitably held in position thereon by means of a nut 64. The central portion of the box 52 has suitably fixed thereon an upwardly projecting part 66 which is adapted to be grasped by the fuel handling mechanism 24, so that the box 52 and the cluster of elements supported thereby may be raised or lowered relative to the reactor core. The upper end of the element supporting box 52 includes the three spaced-apart and laterally extending flanges 54 which are adapted to rest on the upper edges of the top grid plate 40 to thereby support the entire cluster arrangement.

Each cluster of elements is tied together adjacent the lower ends of the elements 22 by graphite keys 68 which extend through aligned openings in the bottom reflector extension portion 42 of the fuel elements. These keys 68 are arranged through each series of three elements in one direction and through at least the center three elements in a direction at right angles to the other three keys. Furthermore, the columns 34 supporting the graphite separators or boxes are narrowed or tapered toward their upper ends and the individual fuel elements 22 are similarly disposed in converging relation at their bottom ends, as seen in FIGURE 2. Consequently, the failure of one or all but one fuel element will not result in the elements falling through the box.

In order to provide passage for the purge flow of fission products from the elements 22 to the tanks 70 in the upper part of the vessel 18, there is provided a series of passages between the fuel element hangers 60 and the tank traps 70. More particularly, the bottom of the cluster supporting box 52 (FIGURE 2) is provided with three parallel passages 72, and each passage 72 intersects the position of the hangers 60 for three of the fuel elements. At this position of intersection, the element hangers 60 are provided with an annular groove 74 having communication with the axial bore 75 in the hanger, in order to provide for flow of fission products through the hanger and into the passage 72. At one end of the passages 72, there is a transverse passageway 76 extending upwardly through one of the side walls 56 of the box, and this passage 76 in turn communicates with one of the box supporting flanges 54 by means of a lateral passage 78 (FIGURE 2) and a downwardly extending bore 80. In the illustrated embodiment, this flange 54 is supported on the top grid plate 40 by a ball and cone bearing joint 82 with the bore 80 extending centrally of the joint. The lower end of this bore 80 is in communication with a passage 84 in the top grid plate 40, which latter passage forms part of a network of passageways extending through the grid plate structure 40. Suitable means, such as ball and cone bearing joints similar to joints 82, are provided for supporting the grid 40 on a side ledge 90 in the vessel and for placing the passages 84 in communication with conduits or the like leading to the fission products tanks 70 along the upper wall of the vessel.

Consequently, it is seen that the central portion of each fuel element 22 is in communication with the fission traps 70 at the upper portion of the vessel through means of the passageways 75 formed in the hanger members, passages 72 and 76 in the bottom and side walls, respectively, of the cluster supporting boxes, and then through the passageways 84 extending through the top grid plate 40.

By locating the fission product traps in the reactor vessel, it will be seen that these traps need not be entirely leakproof. The leakage of fission products is directed into the traps as a result of the pressure flow of the cooling medium being in the direction of the traps.

Although shown and described with respect to a particular embodiment, it will be apparent that various modifications might be made without departing from the principles of this invention.

We claim:

1. In a gas-cooled nuclear reactor having a vertically disposed pressure vessel and a top grid plate supported with said vessel, a fuel element arrangement comprising a plurality of individual elongated vertically disposed fuel elements arranged in side-by-side relation to form a cluster, means tying together the lower ends of said fuel elements, a supporting frame structure releasably supported by said top grid plate, an upwardly extending elongated hanger at the top of each of said fuel elements which connects said fuel element in spaced depending relation from said supporting frame structure, at least a portion of each of said hangers being of substantially smaller horizontal cross section than the cross section of said fuel element, said fuel element cluster being unenclosed between said frame structure and the tops of said fuel elements thereby providing a transverse passageway for gaseous coolant between the lower surface of said supporting frame structure and said fuel elements, and means generally centrally located on said supporting frame structure affording engagement by fuel handling mechanism for transport of the fuel element clusters as a unit.

2. In a gas-cooled nuclear reactor having a vertically disposed pressure vessel and a top grid plate having a plurality of apertures disposed therein supported with said vessel, a fuel element arrangement comprising a plurality of individual elongated vertically disposed fuel elements arranged in side-by-side relation to form a cluster, means tying together the lower ends of said fuel elements, a supporting frame structure releasably supported by said top grid plate, said frame structure being proportioned to interfit within one of the apertures and substantially close the aperture, said frame structure and the aperture being of sufficient size so that said fuel element cluster in assembled condition can be passed therethrough, an upwardly extending elongated hanger at the top of each of said fuel elements which connects said fuel element in spaced depending relation from said supporting frame structure, at least a portion of each of said hangers being of substantially smaller horizontal cross section than the cross section of said fuel element, said fuel element cluster being unenclosed between said frame structure and the tops of said fuel elements and said reduced portions being greater in length than the thickness of an individual fuel element and thereby providing a transverse passageway for gaseous coolant between the lower surface of said supporting frame structure and said fuel elements, and means generally centrally located atop said supporting frame structure affording engagement by fuel handling mechanism for transport of the fuel element clusters as a unit.

3. In a gas-cooled nuclear reactor having a vertically disposed pressure vessel containing a reactor core which includes a top grid plate and in which reactor the flow of gas coolant is from the side walls of the vessel and then downward through the center of the core, a plurality of individual elongated fuel elements arranged in groups and disposed in vertically depending positions within the center of the core in the downward path of the coolant in a manner so that the lateral surfaces of said individual fuel elements are unobstructed along substantially their entire length to provide minimum resistance to the flow of coolant therealong, means releasably interconnecting said plurality of fuel elements, said interconnecting means including a supporting frame adapted to be supported by the top grid plate, hanger means detachably connecting said fuel elements at their tops in depending relation from said supporting frame, said hanger means having a portion of substantially lesser cross section area than the total cross section area of said fuel elements to allow free passage of the gas coolant inwardly from the vessel side walls across the tops of said elements prior to its downward flow, and a plurality of key means interconnecting the bottom portions of said plurality of individual fuel elements, each of said fuel elements being connected to at least two of said keys so that any one of said fuel elements will provide support for any other of said plurality of fuel elements that may suffer failure during reactor operation, and means generally centrally located on said supporting frame affording engagement by fuel handling mechanism for transport of the fuel element cluster as a unit.

4. In a gas-cooled nuclear reactor having a vertically disposed pressure vessel and a top grid plate supported with said vessel, a fuel element arrangement comprising a plurality of individual elongated vertically disposed fuel elements arranged in side-by-side relation to form a cluster, means tying together the lower ends of said fuel elements, a supporting frame structure releasably supported by said top grid plate, an upwardly extending elongated hanger at the top of each of said fuel elements which connects said fuel element in spaced depending relation from said supporting frame structure, at least a portion of each of said hangers being of substantially smaller horizontal cross sections than the cross section of said fuel element, said fuel element cluster being unenclosed between said frame structure and the tops of said fuel elements and thereby providing a transverse passageway for gaseous coolant between the lower surface of said supporting frame structure and said fuel elements, each of said fuel elements having means for admitting a purge flow of gaseous coolant thereto and a longitudinal passage therein for conducting said purge flow to said hanger, said supporting frame structure having passageways therein for collecting the purge flow from each fuel element into one chamber, each of said hangers having a passageway therein in fluid communication with the longitudinal passageway in the fuel element and with the passageways in said supporting frame structure, and means generally centrally located on said supporting frame structure affording engagement by fuel handling mechanism for transport of the fuel element clusters as a unit.

5. In a gas-cooled nuclear reactor having a vertically disposed pressure vessel containing a reactor core, a horizontal top grid plate comprising two sets of parallel beams, said sets being arranged so that the beams in each set are perpendicular to the beams in the other set and so that a plurality of apertures of similar size and shape are provided between crossing beams, said beams of one set having therein longitudinal passageways suitable for passage of a flow of gas, a plurality of individual elongated, vertically disposed fuel elements arranged in side-by-side relation to form a cluster, means releasably interconnecting said plurality of fuel elements, said means including a supporting frame structure of generally box-like shape including a horizontal bottom wall and a plurality of vertical walls, a plurality of flanges extending laterally from the upper portions of said vertical walls for supporting said structure by resting upon the upper surfaces of said beams, said horizontal wall and one of said vertical walls having passageways therein, and the flange extending from said vertical wall having a passageway therein, the passageways in said horizontal wall being in fluid communication with the passageway in said flange through the passageway in said vertical wall, the passageway in said flange being in fluid communication with the longitudinal passageway in the beam upon which it rests, an upwardly extending hanger at the top of each of said fuel elements which detachably connects said fuel element in spaced depending relation from said bottom wall of said supporting frame structure, each of said hangers having a portion of substantially lesser cross section than the cross section of said fuel element, said reduced portions being greater in length than the thickness of an individual fuel element and thereby providing a transverse passageway for gaseous coolant between the lower surface of said supporting frame structure and said fuel elements, each of said fuel elements having means for admitting a purge flow of gaseous coolant thereto and a longitudinal passage therein for conducting said purge flow to said hanger, each of said hangers having a passageway therein in fluid communication with the longitudinal passageway in the fuel element and with a passageway in said bottom wall of said supporting frame structure, and means generally centrally located on said supporting frame structure affording engagement by fuel handling mechanism for transport of the fuel element clusters as a unit.

References Cited by the Examiner

UNITED STATES PATENTS

| 2,799,642 | 7/57 | Hurwitz | 176—71 |
| 2,863,815 | 12/58 | Moore | 176—29 |
| 2,894,893 | 7/59 | Carney | 176—41 |
| 2,898,280 | 8/59 | Schultz | 176—78 |
| 2,938,848 | 5/60 | Ladd | 176—72 |
| 2,997,435 | 8/61 | Millar | 176—59 |
| 3,000,728 | 9/61 | Long | 176—61 |
| 3,010,889 | 11/61 | Fortescue | 176—19 |
| 3,034,689 | 5/62 | Stoughton et al. | 176—59 X |
| 3,039,947 | 6/62 | Fortescue et al. | 176—71 |
| 3,089,834 | 5/63 | Madsen | 176—30 |

OTHER REFERENCES

Glasstone: Principles of Nuclear Reactor Engineering, Van Nostrand, 1956, page 29.

CARL D. QUARFORTH, *Primary Examiner.*

REUBEN EPSTEIN, *Examiner.*